(12) United States Patent
Yufune et al.

(10) Patent No.: US 11,165,217 B2
(45) Date of Patent: Nov. 2, 2021

(54) LASER BEAM IRRADIATION DETECTION DEVICE, LASER BEAM IRRADIATION DETECTION METHOD, AND LASER BEAM IRRADIATION DETECTION SYSTEM

(71) Applicant: JVCKENWOOD Corporation, Yokohama (JP)

(72) Inventors: Shuta Yufune, Yokohama (JP); Takuya Hirata, Yokohama (JP); Takeshi Igarashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 135 days.

(21) Appl. No.: 16/560,369

(22) Filed: Sep. 4, 2019

(65) Prior Publication Data

US 2019/0393670 A1  Dec. 26, 2019

Related U.S. Application Data

(63) Continuation of application No. PCT/JP2017/036300, filed on Oct. 5, 2017.

(30) Foreign Application Priority Data

Mar. 6, 2017  (JP) .............................. JP2017-041441

(51) Int. Cl.
*H01S 3/10* (2006.01)
*G01N 21/17* (2006.01)
(Continued)

(52) U.S. Cl.
CPC ......... *H01S 3/10023* (2013.01); *G01N 21/17* (2013.01); *G01N 21/63* (2013.01); *H01S 3/0007* (2013.01); *G01N 2021/1765* (2013.01)

(58) Field of Classification Search
CPC ...... H01S 3/10023; H01S 3/0007; H01S 3/00; G01N 21/17; G01N 21/63;
(Continued)

(56) References Cited

U.S. PATENT DOCUMENTS 3,698,816 A * 10/1972 Lutchansky .............. G01S 5/16
356/152.1
5,243,179 A * 9/1993 Bjorkman ............... G01S 3/781
250/206.2

(Continued)

FOREIGN PATENT DOCUMENTS

DE  102015009353 A1  3/2017
JP  2000046958 A  2/2000
(Continued)

OTHER PUBLICATIONS

Espacenet English translation of EP 3118563 (2015).*
(Continued)

*Primary Examiner* — Mohamed K Amara
(74) *Attorney, Agent, or Firm* — Nath, Goldberg & Meyer; Jerald L. Meyer (57) ABSTRACT

A bandpass filter allows a light ray of a predetermined band including a wavelength band of a color of a laser beam, which is a target of detection, among light rays from a subject to pass therethrough. An imaging unit of a video camera captures the light ray passing through the bandpass filter. The controller analyzes a frequency for each brightness level of a video signal generated based on an imaging signal output from the imaging unit and detects a peak at which the frequency protrudes at a specific brightness level. The controller detects a trajectory of a straight light ray in a frame of the video signal. The controller detects that the
(Continued)

laser beam is irradiated when the peak exists at a specific brightness level and the trajectory of the light ray exists in the frame.

5 Claims, 12 Drawing Sheets

(51) Int. Cl.
*G01N 21/63* (2006.01)
*H01S 3/00* (2006.01)

(58) Field of Classification Search
CPC ............ G01N 2021/1765; B64D 47/08; B64D 45/0015; G01S 3/784; G01S 5/16; G01S 7/495; H04N 5/225; A61F 9/022; F41G 3/147; F41H 13/00; G01B 11/14; G01J 1/0219; G01J 1/0488; G01J 1/4228; G01J 2005/0077; G01J 3/51; G01J 5/602; G06T 7/74
See application file for complete search history.

(56) References Cited

U.S. PATENT DOCUMENTS

| | | | | |
|---|---|---|---|---|
| 5,914,661 | A * | 6/1999 | Gross | A42B 3/046 340/600 |
| 6,101,333 | A * | 8/2000 | Bullitt | G03B 17/48 348/366 |
| 7,429,734 | B1 * | 9/2008 | Tidwell | F41H 11/02 250/338.1 |
| 7,531,775 | B1 * | 5/2009 | Strawa | G01J 1/04 250/200 |
| 7,846,028 | B2 * | 12/2010 | Small | A63F 9/0291 463/51 |
| 9,953,226 | B2 | 4/2018 | Midavaine et al. | |
| 10,228,451 | B2 * | 3/2019 | Chankaya | G01S 5/16 |
| 10,690,543 | B1 * | 6/2020 | Wo | G01J 1/0271 |
| 2002/0179818 | A1 * | 12/2002 | Gauthier, Jr. | G01S 7/4804 250/206.1 |
| 2014/0192367 | A1 * | 7/2014 | Jungwirth | G01J 3/50 356/614 |
| 2014/0376768 | A1 * | 12/2014 | Troy | G01S 3/7864 382/103 |
| 2015/0205126 | A1 * | 7/2015 | Schowengerdt | H04N 5/21 345/633 |
| 2015/0276427 | A1 * | 10/2015 | Lin | G01C 23/00 340/973 |
| 2016/0139249 | A1 * | 5/2016 | Levy | G01S 7/493 250/203.2 |
| 2017/0131088 | A1 * | 5/2017 | Masuda | G01S 17/10 |
| 2017/0153319 | A1 * | 6/2017 | Villeneuve | G01S 7/4804 |
| 2017/0191314 | A1 * | 7/2017 | Faircloth | H01S 3/0941 |
| 2017/0219710 | A1 * | 8/2017 | Schmidt | G01S 17/42 |
| 2018/0329024 | A1 * | 11/2018 | Send | G01S 17/46 |
| 2019/0008019 | A1 * | 1/2019 | Le Henaff | G01S 5/02 |

FOREIGN PATENT DOCUMENTS

| | | |
|---|---|---|
| JP | 2000-101177 A | 4/2000 |
| JP | 2004-54105 A | 2/2004 |
| JP | 2011-165732 A | 8/2011 |
| JP | 2016173282 A | 9/2016 |
| WO | 2015118075 A1 | 8/2015 |

OTHER PUBLICATIONS

Office Action dated Jun. 23, 2020 for application No. JP2017-041441.
Search Report dated Feb. 17, 2020 issued in corresponding European Application No. 17899963.7.

* cited by examiner

FIG. 15

LASER BEAM IRRADIATION DETECTION DEVICE, LASER BEAM IRRADIATION DETECTION METHOD, AND LASER BEAM IRRADIATION DETECTION SYSTEM

CROSS REFERENCE TO RELATED APPLICATION

This application is a Continuation of PCT Application No. PCT/JP2017/036300, filed on Oct. 5, 2017, and claims the priority of Japanese Patent Application No. 2017-041441, filed on Mar. 6, 2017, the entire contents of both of which are incorporated herein by reference.

BACKGROUND

The present disclosure relates to a laser beam irradiation detection device, a laser beam irradiation detection method, and a laser beam irradiation detection system capable of detecting that a predetermined target object is irradiated with a laser beam.

Cases have occurred in which a laser beam is irradiated to a target object such as a windshield of a cockpit of an airplane due to mischief or the like.

SUMMARY

Heretofore, a detection device for detecting a laser beam irradiated to a target object due to mischief has not been put to practical use.

A first aspect of one or more embodiments provides a laser beam irradiation detection device including: a bandpass filter configured to allow a light ray of a predetermined band including a wavelength band of a color of a laser beam, which is a target of detection, among light rays from a subject to pass therethrough; an imaging unit configured to image the light ray passing through the bandpass filter; and a detector configured to analyze a frequency for each brightness level of a video signal generated based on an imaging signal output from the imaging unit to detect a peak at which the frequency protrudes at a specific brightness level, and to detect a trajectory of a straight light ray in a frame of the video signal to detect that the laser beam is irradiated, when it is detected that the peak exists at the specific brightness level and the trajectory of the light ray exists in the frame.

A second aspect of one or more embodiments provides a laser beam irradiation detection method including: allowing a light ray of a predetermined band including a wavelength band of a color of a laser beam, which is a target of detection, among light rays from a subject to pass and attenuating light rays in other bands with a bandpass filter; imaging the light ray of the predetermined band with an imaging unit; analyzing a frequency for each brightness level of a video signal generated based on an imaging signal output from the imaging unit and detecting a peak at which the frequency protrudes at a specific brightness level; detecting a trajectory of a straight light ray in a frame of the video signal; and detecting that the laser beam is irradiated when it is detected that the peak exists at the specific brightness level and the trajectory of the light ray exists in the frame.

A third aspect of one or more embodiments provides a laser beam irradiation detection system including: a plurality of laser beam irradiation detection devices with mutually offset ranges for imaging a subject; a system control device to which image data output from the plurality of laser beam irradiation detection devices are supplied; and a monitor which displays an image based on the image data which is output from the plurality of laser beam irradiation detection devices and supplied to the system control device.

Each of the plurality of the laser beam irradiation detection device includes: an image synthesizing unit configured to synthesize a first video signal generated based on a first imaging signal that captures a light ray from a subject and a second video signal generated based on a second imaging signal that captures a light ray obtained by causing a light ray of a predetermined band including a wavelength band of a color of the laser beam, which is a target of detection, among light rays from the subject to pass through a bandpass filter, and to generate a synthesized video signal; a detector configured to analyze a frequency for each brightness level of the second video signal, to detect a peak at which a frequency protrudes at a specific brightness level, to detect a trajectory of a straight light ray in a frame of the second video signal, and to detect that the laser beam is irradiated when it is detected that the peak exists at the specific brightness level and the trajectory of the light ray exists in the frame; and a position and direction information generator configured to generate emission position information indicating a laser beam emission position or emission position direction information indicating an emission position direction, and to supply the information to the system control device, when the detector detects that the laser beam is irradiated.

The system control device is configured to display on the monitor a synthesized image based on the synthesized video signal generated by the image synthesizing unit, and to superimpose and display an identification image indicating the laser beam emission position or the emission position direction on the synthesized image based on the emission position information or the emission position direction information.

DETAILED DESCRIPTION

Hereinafter, a laser beam irradiation detection device, a laser beam irradiation detection method, and a laser beam irradiation detection system according to one or more embodiments will be described with reference to the accompanying drawings. In one or more embodiments, a case where a target object irradiated with a laser beam is a windshield or a cockpit window in front of a cockpit of an airplane is taken as an example. Hereinafter, a windshield or the like includes at least one of the windshield and the cockpit window.

Figure 1:
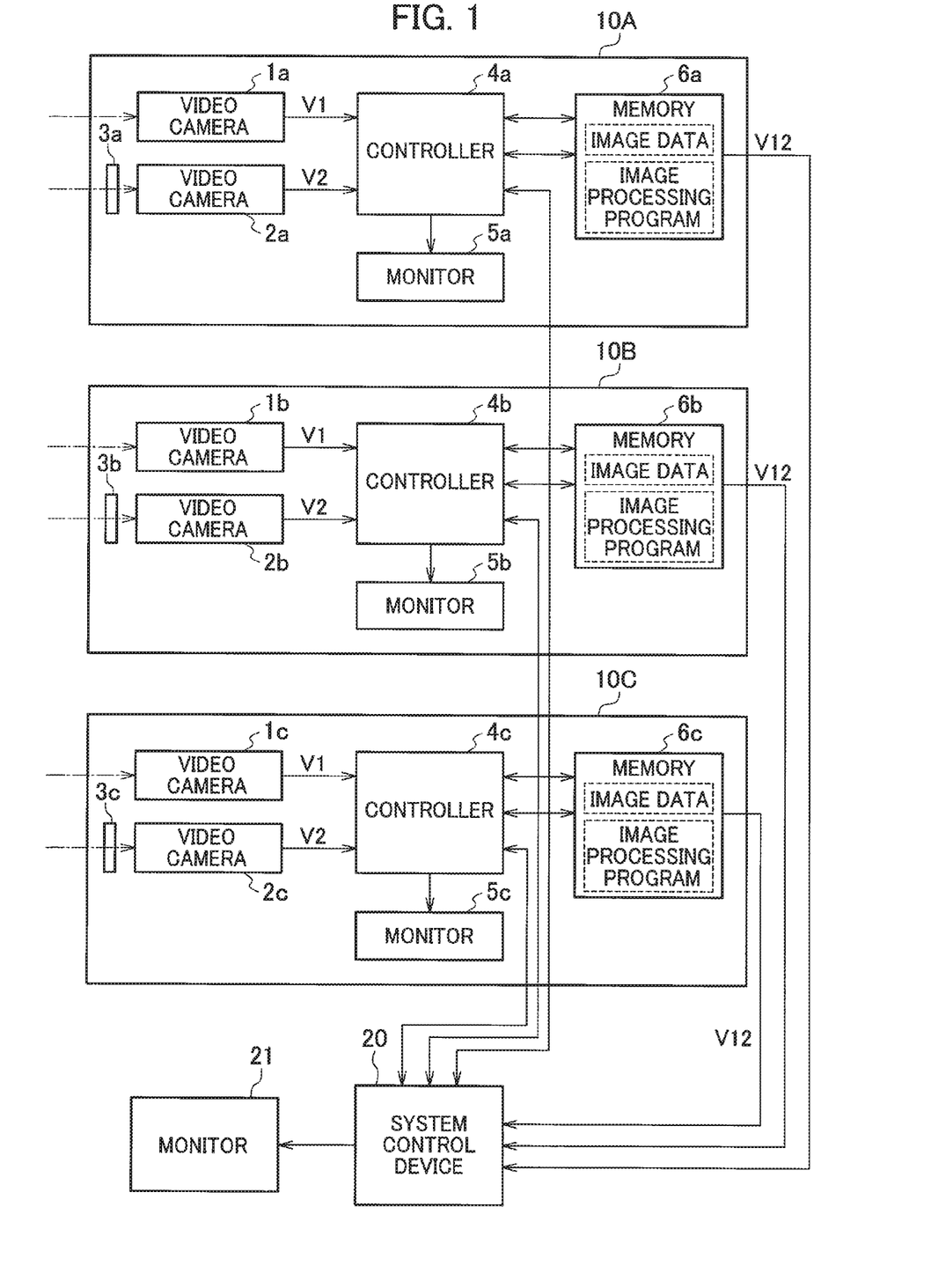
FIG. 1 is a block diagram illustrating a laser beam irradiation detection device and a laser beam irradiation detection system according to one or more embodiments.

In FIG. 1, the laser beam irradiation detection system includes laser beam irradiation detection devices 10A, 10B, and 10C, a system control device 20, and a monitor 21, as an example. The laser beam irradiation detection devices 10A to 10C are collectively referred to as a laser beam irradiation detection device 10.

The laser beam irradiation detection device 10A includes a video camera 1a, a video camera 2a with a bandpass filter 3a mounted on the front, a controller 4a, a monitor 5a, and a memory 6a. A laser beam irradiation detection device 10B includes a video camera 1b, a video camera 2b with a bandpass filter 3b mounted on the front, a controller 4b, a monitor 5b, and a memory 6b.

A laser beam irradiation detection device 10C includes a video camera 1c, a video camera 2c with a bandpass filter 3c mounted on the front, a controller 4c, a monitor 5c, and a memory 6c.

The video cameras 1a, 1b, and 1c are collectively referred to as a video camera 1. The video cameras 2a, 2b, and 2c are collectively referred to as a video camera 2. The bandpass filters 3a, 3b, and 3c are collectively referred to as a bandpass filter 3. The controllers 4a, 4b, and 4c are collectively referred to as a controller 4. The monitors 5a, 5b, and 5c are collectively referred to as a monitor 5. The memories 6a, 6b, and 6c are collectively referred to as a memory 6.

The video cameras 1 and 2 are normal video cameras capable of capturing an image of a visible light region, and may be commercially available consumer video cameras or business video cameras. The video camera 1 and the video camera 2 operate in synchronization and capture images of the same subject at the same angle of view.

Figure 2:
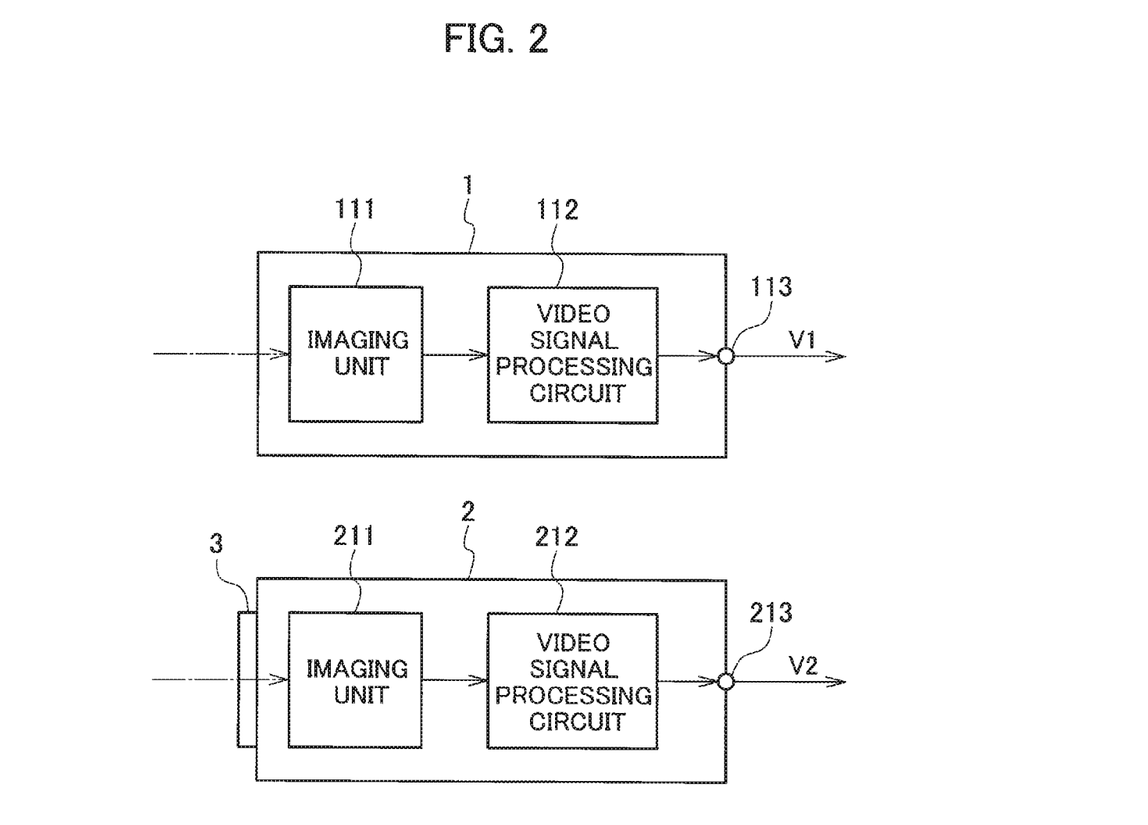
FIG. 2 is a block diagram illustrating a schematic configuration of video cameras 1 and 2 in FIG. 1.

As illustrated in FIG. 2, the video camera 1 roughly includes an imaging unit 111 including a lens and an imaging element, a video signal processing circuit 112 that generates a video signal based on an imaging signal output from the imaging unit 111, and a video output terminal 113 for outputting a video signal V1 to the outside. Similarly, the video camera 2 includes an imaging unit 211, a video signal processing circuit 212 that generates a video signal based on an imaging signal output from the imaging unit 211, and a video output terminal 213 for outputting a video signal V2 to the outside.

The video camera 1 and the video camera 2 have the same configuration, and the bandpass filter 3 is attached to the front of the lens of the video camera 2. The imaging unit 111 captures a light ray from a subject which does not pass through the bandpass filter 3, and the imaging unit 211 captures a light ray which passes through the bandpass filter 3. The light ray from the subject is a light ray reflected from the subject and may include a laser beam emitted from a laser beam source. The controller 4 is supplied with the video signals V1 and V2 output from the video output terminals 113 and 213.

The bandpass filter 3 allows a light ray of a predetermined band including the wavelength band of the color of the laser beam, which is the target of the detection, among the light rays from the subject to pass therethrough and attenuates a light ray of other bands. In many cases, laser beams to be irradiated due to mischief to a windshield or the like of a cockpit of an airplane are green laser beams. Therefore, it is preferable that a filter which allows a light ray in a band including the wavelength band of green color to pass therethrough be used as the bandpass filter 3.

When a red laser beam is to be detected, it is preferable that a filter which allows a light ray in a band including the wavelength band of red color be used as the bandpass filter 3. The bandpass filter 3 may be a filter which allows light ray in a band including the wavelength bands of green and red to pass therethrough.

The controller 4 can be configured by a microprocessor. The controller 4 and the memory 6 may be microcomputers and the controller 4 may be a central processing unit (CPU). The monitor 5 is a liquid crystal panel which displays an image based on the video signal V1 or a synthesized video signal V12 described below, for example. The laser beam irradiation detection device 10 may not include the monitor 5.

The memory 6 stores an image processing program and the controller 4 executes the image processing program. The memory 6 stores image data, which will be described below, generated by the controller 4 executing the image processing program.

The system control device 20 can be configured by a personal computer. The system control device 20 controls the laser beam irradiation detection devices 10A to 10C. Various types of information to be described below are input from the controller 4 to the system control device 20 and image data (synthesized video signal V12) is input from the memory 6.

Figure 3A:
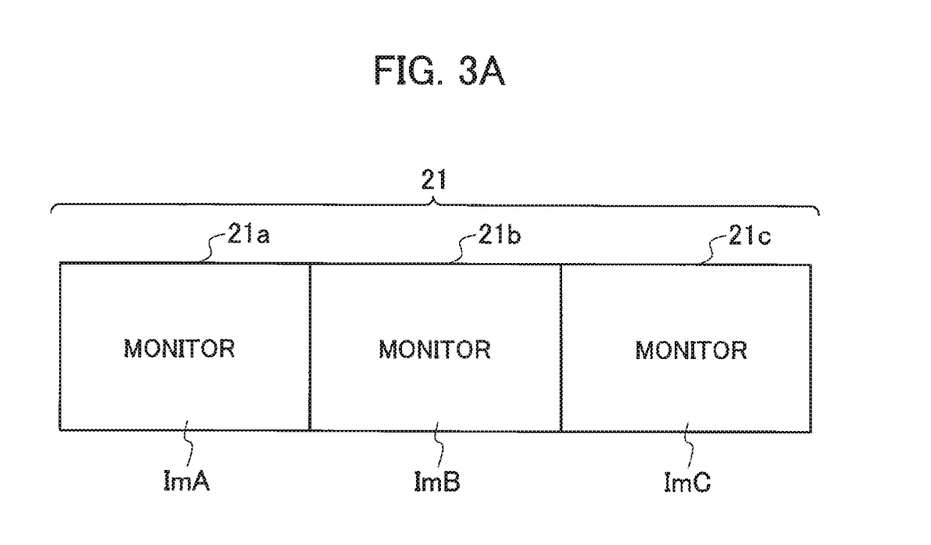
FIG. 3A is a view illustrating a first configuration example of a monitor 21 in FIG. 1.

The monitor 21 displays an image based on the image data input to the system control device 20. As illustrated in FIG. 3A, the monitor 21 may be configured by a multi-monitor consisting of monitors 21a, 21b, and 21c.

In this case, the monitor 21a displays an image ImA based on the image data output from the laser beam irradiation detection device 10A. The monitor 21b displays an image ImB based on the image data output from the laser beam irradiation detection device 10B. The monitor 21c displays an image ImC based on the image data output from the laser beam irradiation detection device 10C.

Figure 3B:
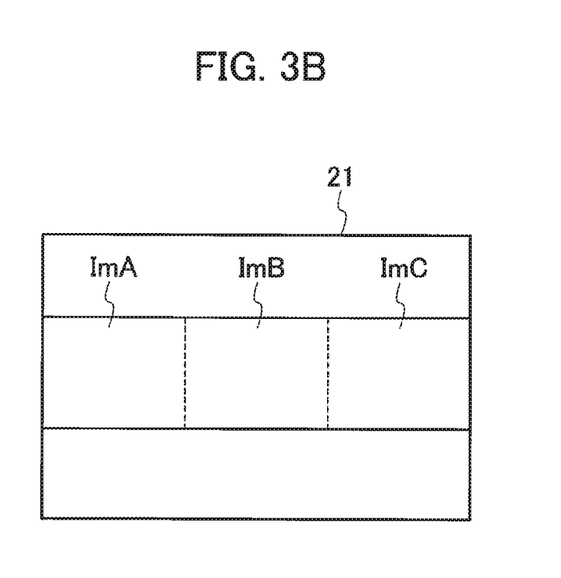
FIG. 3B is a view illustrating a second configuration example of the monitor 21 in FIG. 1.

As illustrated in FIG. 3B, the monitor 21 may be a single monitor in which the system control device 20 displays an image based on synthesized image data obtained by synthesizing the image data from the laser beam irradiation detection devices 10A to 10C. In one or more embodiments, it is assumed that the monitor 21 is configured by the monitors 21a to 21c illustrated in FIG. 3A.

Figure 4:
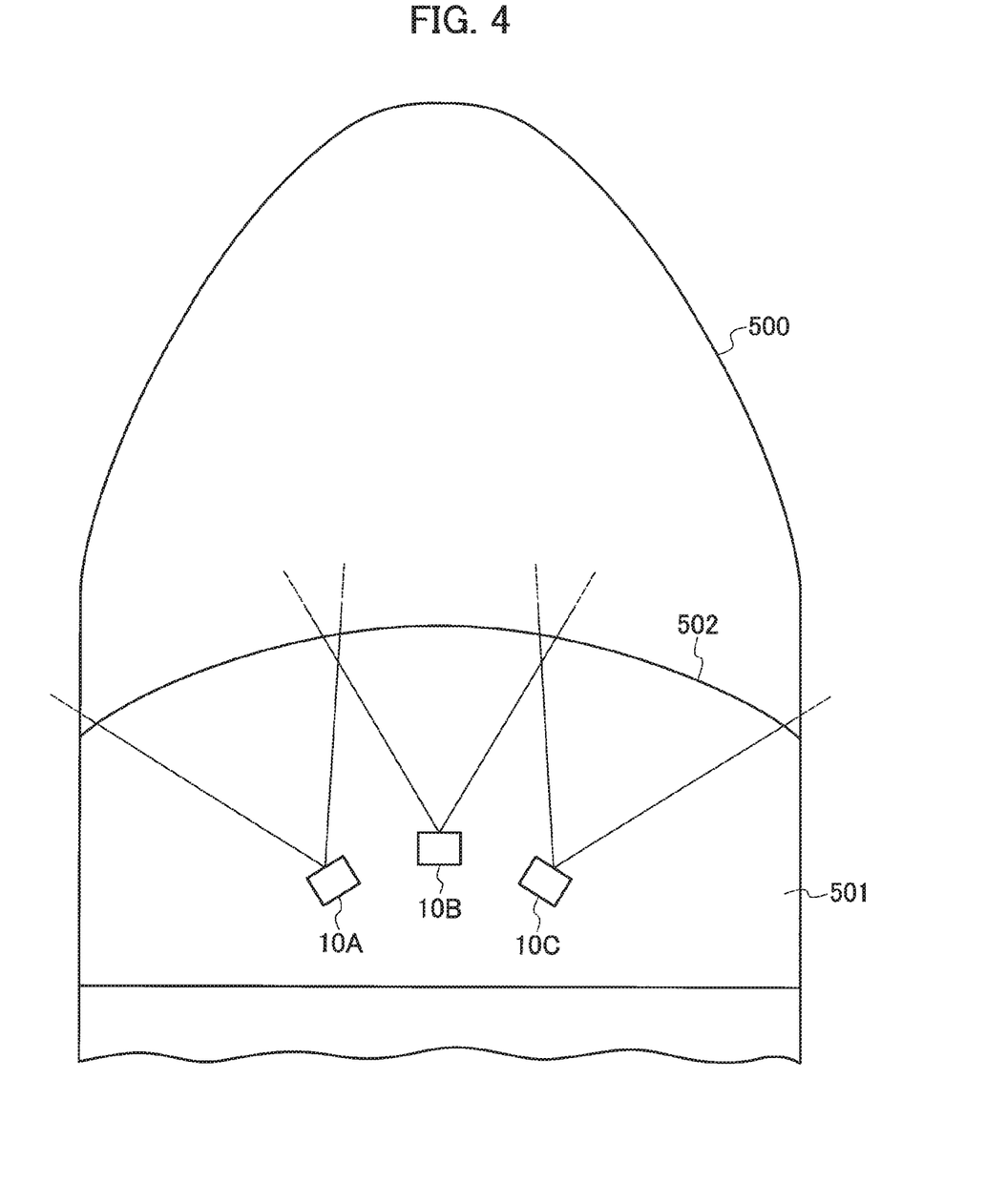
FIG. 4 is a view illustrating an example of an installation place of the laser beam irradiation detection device according to one or more embodiments.

As illustrated in FIG. 4, the laser beam irradiation detection devices 10A to 10C are arranged in a cockpit 501 of an airplane 500 such that video cameras 1 and 2 capture the front of a windshield 502, as an example. Here, for convenience, the entire windshield and cockpit window is referred to as the windshield 502. The laser beam irradiation detection devices 10A to 10C are arranged to capture substantially the entire field of view in front of the windshield 502 while shifting the ranges captured by the video cameras 1 and 2.

The system control device 20 and the monitor 21 may be arranged at any position in the cockpit 501 or may be arranged outside of the cockpit 501. The laser beam irradiation detection device 10 and the system control device 20 may be connected by wire or may be connected wirelessly.

Figure 5:
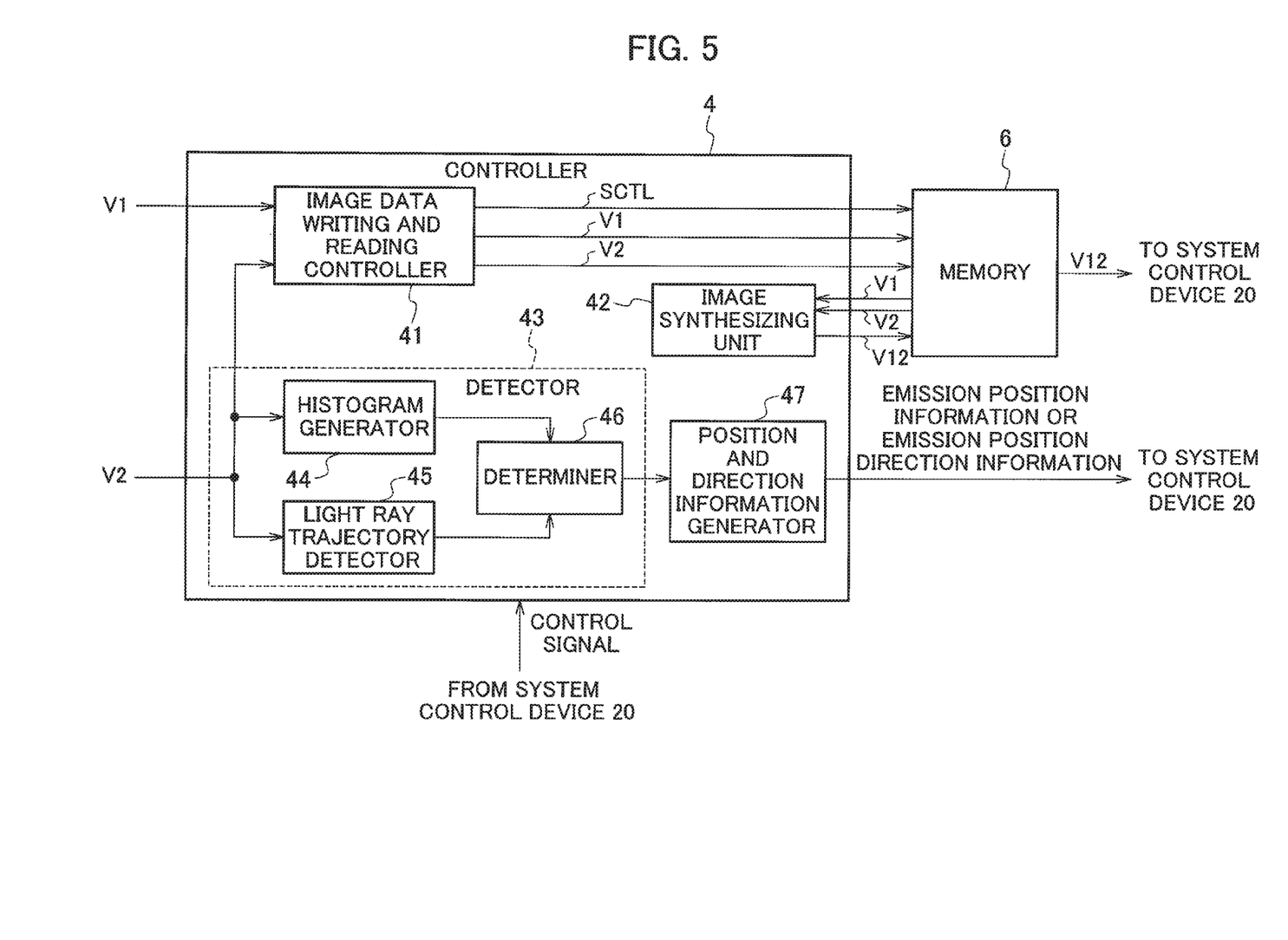
FIG. 5 is a block diagram illustrating an example of a functional internal configuration of a controller 4 (4a to 4c) in FIG. 1.

An example of a functional internal configuration of the controller 4 when the controller 4 executes the image processing program will be described using FIG. 5. The controller 4 includes an image data writing and reading controller 41, an image synthesizing unit 42, a detector 43, and a position and direction information generator 47. The detector 43 includes a histogram generator 44, a light ray trajectory detector 45, and a determiner 46.

The data writing and reading controller 41 supplies the memory 6 with the write or read control signal SCTL, writes the video signals V1 and V2 into the memory 6, and reads the video signals V1 and V2 from the memory 6. The image synthesizing unit 42 synthesizes the video signals V1 and V2 read from the memory 6 to generate a synthesized video signal V12.

The synthesized video signal V12 is written to the memory 6 as image data. The synthesized video signal V12 read from the memory 6 is supplied to the system control device 20.

Figure 6:
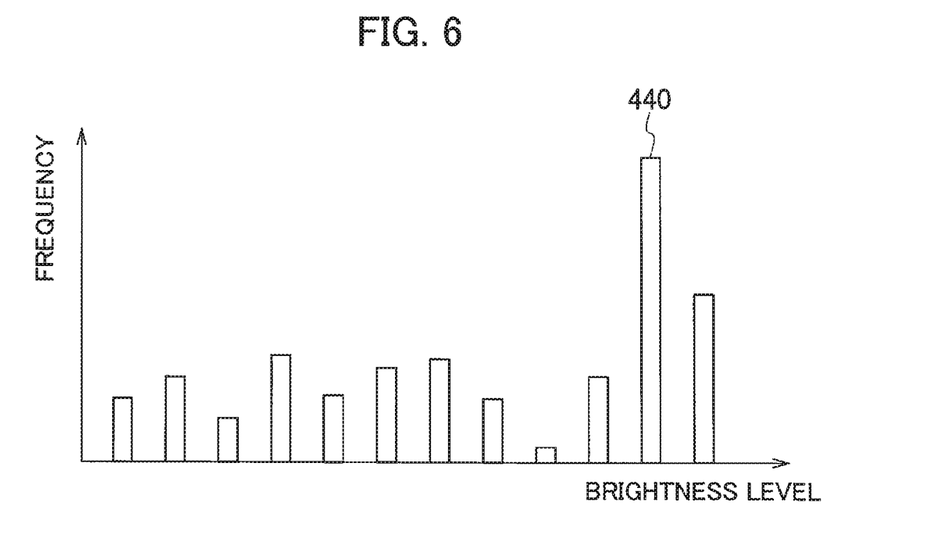
FIG. 6 is a view illustrating an example of a histogram generated by a histogram generator 44 in FIG. 5.

As illustrated in FIG. 6, the histogram generator 44 analyzes the frequency for each brightness level of the video signal V2 generated based on the image signal output from the imaging unit 211 and generates a histogram. The histogram illustrated in FIG. 6 includes a peak 440 at which the frequency protrudes at a specific brightness level on a high luminance side. The histogram is supplied to the determiner 46.

Figure 7:
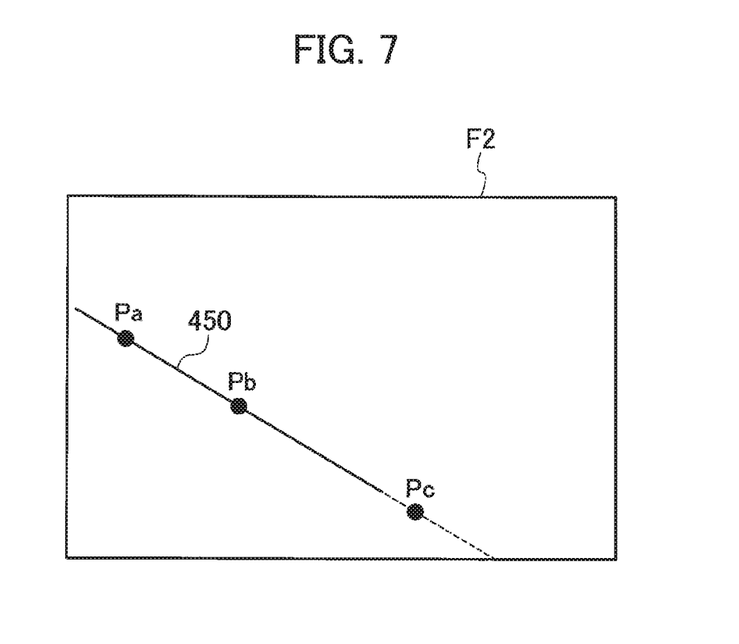
FIG. 7 is a view illustrating an example of a straight ray trajectory existing in a frame.

The light ray trajectory detector 45 detects whether a straight light ray trajectory exists in a frame of the video signal V2. In FIG. 7, a trajectory 450 of the straight light ray exists in a frame F2. A part of the trajectory 450, which is the portion illustrated by a dashed line, is a tip side in an advancing direction of the light ray and indicates that the luminance thereof is smaller than that near the laser beam source.

When any three bright spots Pa, Pb, and Pc on the trajectory 450 satisfy ax+by+c=0 with a, b, and c as constants and x and y as variables, the light ray trajectory detector 45 determines that the trajectory 450 is a straight line. The light ray trajectory detector 45 can detect, based on the determination result, whether a straight light ray trajectory exists in the frame F2.

When it is determined that the peak exists at a specific brightness level of the histogram and a straight light ray trajectory exists in the frame F2, the determiner 46 determines that the trajectory is the trajectory of the light ray formed by the irradiation of the laser beam, and the windshield 502 is irradiated with the laser beam.

When it is determined by the determiner 46 that the windshield 502 is irradiated with the laser beam, the position and direction information generator 47 generates emission position information indicating the emission position of the laser beam or emission position direction information indicating the direction of the emission position as follows. The position and direction information generator 47 operates as an emission position detector and an emission position direction estimating unit.

Figure 8:
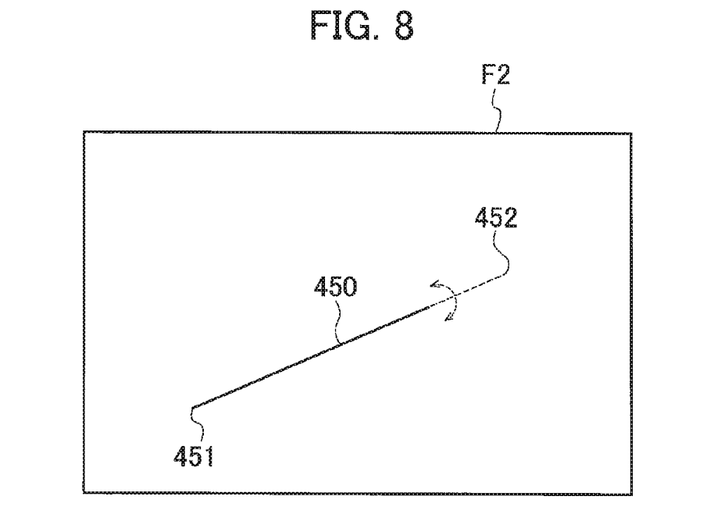
FIG. 8 is a view illustrating an example of a laser beam trajectory in which an emission position of the laser beam exists in the frame.

FIG. 8 illustrates a case where the laser beam emission position (that is, the position of the laser beam source) exists within the angle of view of the video camera 2. In the example illustrated in FIG. 8, a first end portion 451 and a second end portion 452 of the trajectory 450 of the laser beam are located inside the frame F2. The second end portion 452 may be located at an end portion of the frame F2, not inside the frame F2.

When the condition that, in the trajectory 450, the brightness level decreases from the first end portion 451 side to the second end portion 452 side, and the first end portion 451 exists inside the frame F2 is satisfied, the position and direction information generator 47 detects the first end portion 451 as the laser beam emission position. The position and direction information generator 47 generates and outputs laser beam emission position information.

A person carrying a laser beam source may shake the laser beam source. Therefore, while the bright spot on the first end portion 451 side is unlikely to move, the bright spot on the second end portion 452 side may move in an arc shape. When the condition that the bright spot on the second end portion 452 side moves in an arc shape as satisfied in addition to the above conditions, the position and direction information generator 47 may detect the first end portion 451 as the laser beam emission position. In this way, it is possible to improve the detection accuracy of the laser beam emission position.

Figure 9:
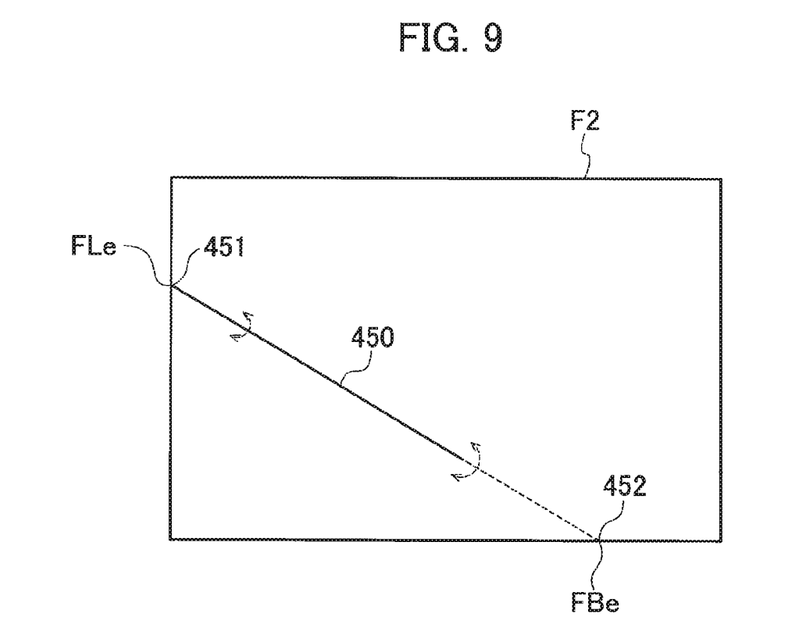
FIG. 9 is a view illustrating an example of a laser beam trajectory in which it is estimated that an emission position of the laser beam exists outside the frame.

FIG. 9 illustrates a case where the laser beam emission position does not exist within the angle of view of the video camera 2. In an example illustrated in FIG. 9, the first end portion 451 is located at a left end portion FLe of the frame F2 and the second end portion 452 is located at a lower end portion FBe of the frame F2. The second end portion 452 may be located inside the frame F2.

When satisfying the condition that, in the trajectory 450, the brightness level decreases from the first end portion 451 side to the second end portion 452 side and the first end portion 451 is located at the end portion of the frame F2, the position and direction information generator 47 estimates that the laser beam emission position exists in a direction in which the trajectory 450 extends outward beyond the first end portion 451. The position and direction information generator 47 generates and outputs laser beam emission position direction information.

As similar to FIG. 8, when a person holding the laser beam source shakes the laser beam source, the bright spot on the first end portion 451 side moves only in a small arc shape, while the bright spot on the second end portion 452 side moves largely in an arc shape.

When, in addition to the above condition, satisfying the condition that the bright spot on the second end portion 452 side moves more largely in an arc shape than the bright spot on the first end portion 451 side, the position and direction information generator 47 may estimate that the laser beam emission position exists in a direction in which the trajectory 450 extends outward beyond the first end portion 451. In this way, it is possible to improve the estimation accuracy of the laser beam emission position direction.

Figure 10:
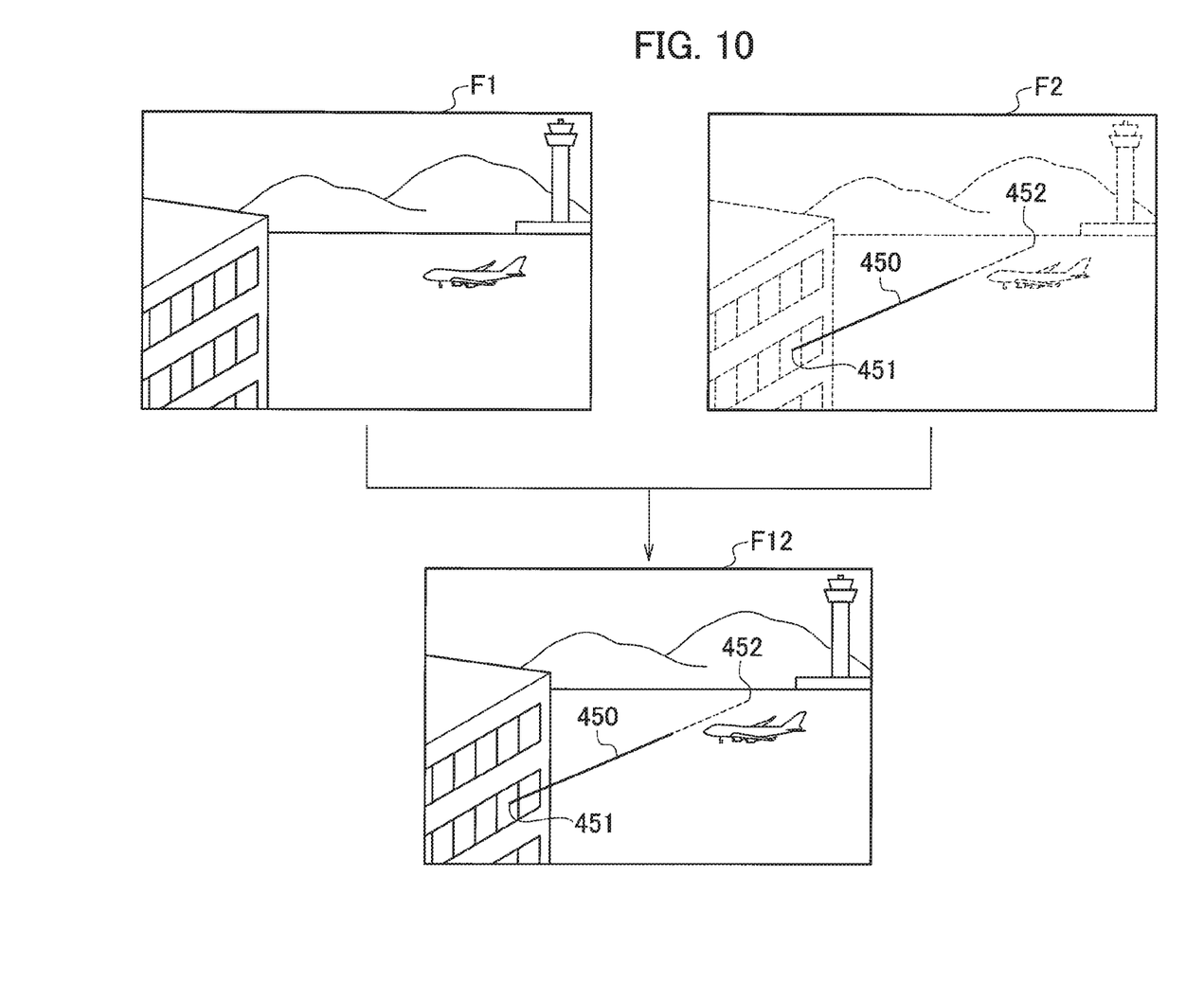
FIG. 10 is a view for explaining an operation of an image synthesizing unit 42 in FIG. 5.

FIG. 10 conceptually illustrates a synthesized frame F12 of the synthesized video signal V12 generated by the image synthesizing unit 42 synthesizing the frame F1 of the video signal V1 and the frame F2 of the video signal V2. The frame F1 shows a normal view of an airfield captured by the video camera 1.

The frame F2 shows a view in a state in which the trajectory 450 by the laser beam is clearly captured by the video camera 2 imaging the light ray which passes through the bandpass filter 3. In the frame F2, the light ray in a band other than the pass band of the bandpass filter 3 is attenuated, so it is difficult to determine where in the view the emission position (first end portion 451) of the laser beam or the emission position direction is located.

By the image synthesizing unit 42 generating the synthesized frame F12, which is a synthesized image, it is possible to superimpose the trajectory 450 by the laser beam on the normal view captured by the video camera 1. By watching the synthesized frame F12 displayed on the monitor 21, a monitoring person can easily determine where the laser beam emission position or the emission position direction is located in the view.

Figure 11:
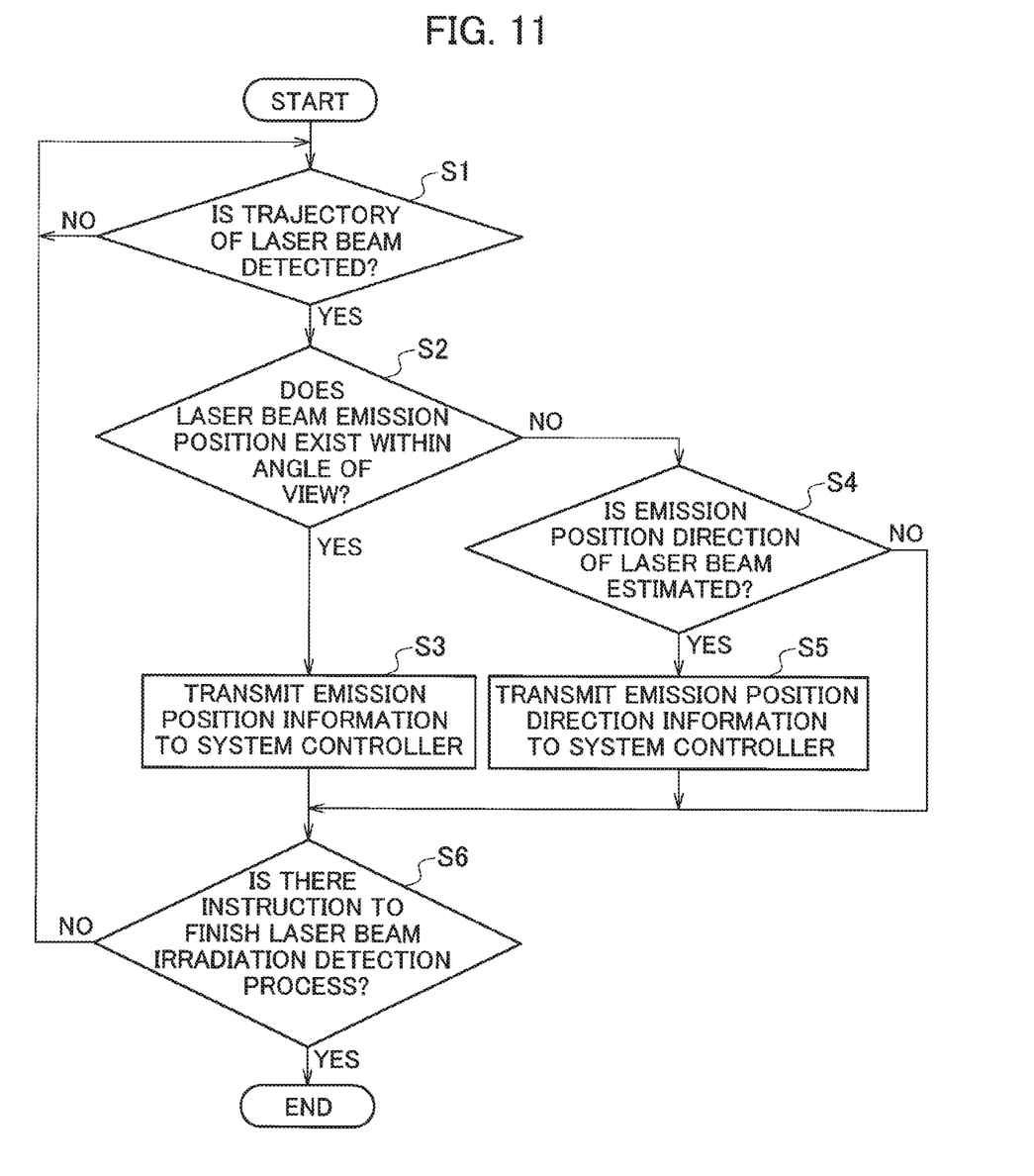
FIG. 11 is a flowchart illustrating an operation of the laser beam irradiation detection device and a process performed by a laser beam irradiation detection method according to one or more embodiments.

The operation of the laser beam irradiation detection device 10 and the process performed by the laser beam irradiation detection method will be described using a flowchart illustrated in FIG. 11. In FIG. 11, when the laser beam irradiation detection process is started, the laser beam irradiation detection device 10 (controller 4) determines in step S1 whether the trajectory 450 of the laser beam is detected. When the trajectory 450 of the laser beam is not detected (NO), the laser beam irradiation detection device 10 repeats the process of step S1.

When the trajectory 450 of the laser beam is detected (YES), the laser beam irradiation detection device 10 determines in step S2 whether the laser beam emission position exists within the angle of view. When the laser beam emission position exists within the angle of view (YES), the laser beam irradiation detection device 10 transmits the emission position information to the system control device 20 in step S3 and shifts the process to step S6.

When the laser beam emission position does not exist within the angle of view in step S2 (NO), the laser beam irradiation detection device 10 determines in step S4 whether the direction of the laser beam emission position can be estimated. When the direction of the laser beam emission position can be estimated (YES), the laser beam irradiation detection device 10 transmits the emission position direction information to the system control device 20 in step S5 and shifts the process to step S6. When the direction of the laser beam emission position cannot be estimated (NO), the laser beam irradiation detection device 10 shifts the process to step S6.

In step S6, the laser beam irradiation detection device 10 determines whether the end of the laser beam irradiation detection process is instructed. When the end of the laser beam irradiation detection process is not instructed (NO), the laser beam irradiation detection device 10 returns the process to step S1 and repeats the processes of steps S1 to S6. When the end of the laser beam irradiation detection process is instructed (YES), the laser beam irradiation detection device 10 ends the process.

Figure 12:
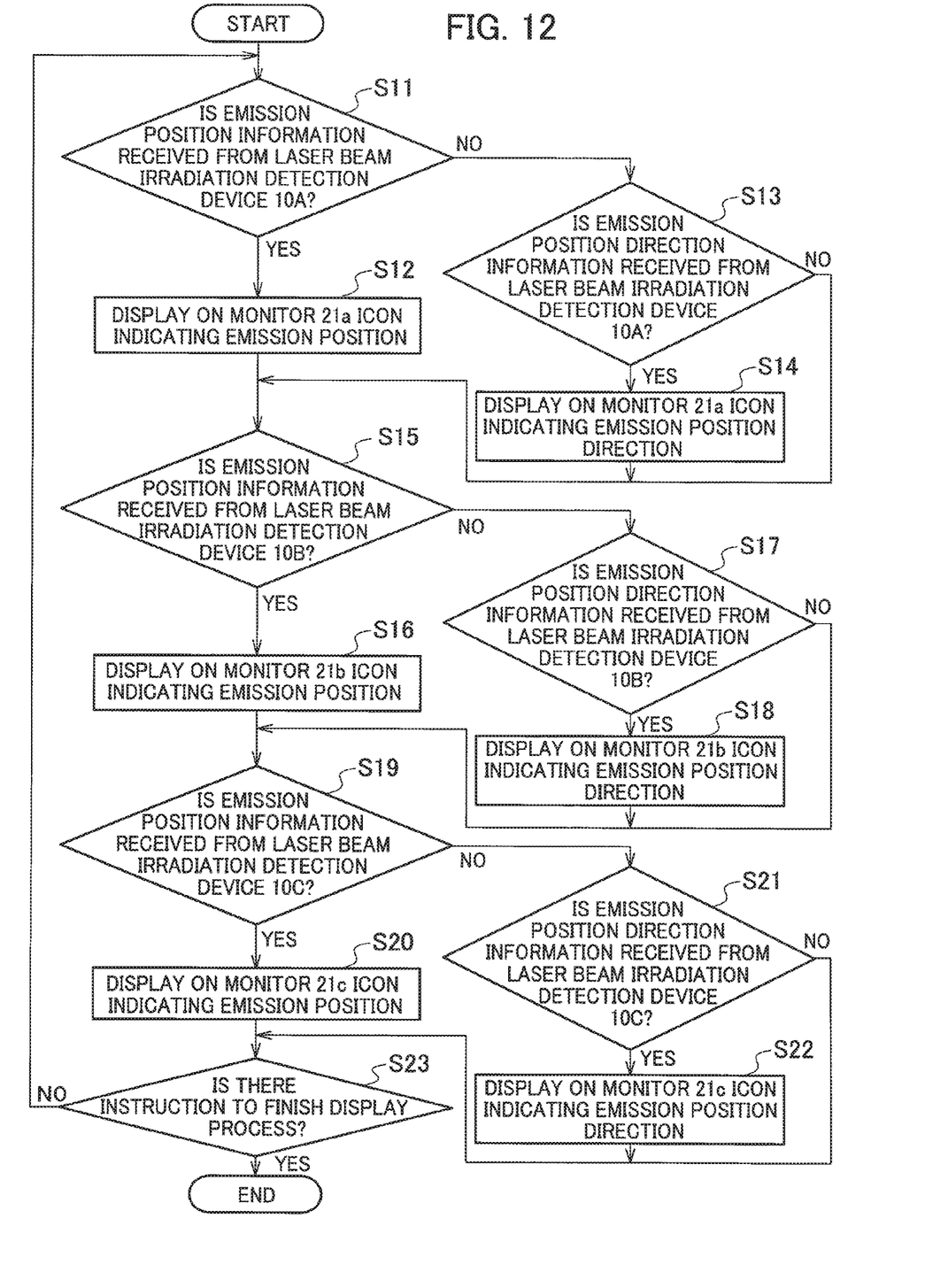
FIG. 12 is a flowchart illustrating an operation of a system control device 20 in the laser beam irradiation detection system according to one or more embodiments.

The operation of the system control device 20 will be described using the flowchart illustrated in FIG. 12. In FIG. 12, when the display process of the laser beam irradiation detection result is started, the system control device 20 determines in step S11 whether the emission position information is received from the laser beam irradiation detection device 10A. When the emission position information is received from the laser beam irradiation detection device 10A (YES), the system control device 20 causes the monitor 21a to display an icon (identification image) indicating the emission position in step S12 and shifts the process to step S15.

When the emission position information is not received from the laser beam irradiation detection device 10A in step S11 (NO), the system control device 20 determines in step S13 whether the emission position direction information is received from the laser beam irradiation detection device 10A. When the emission position direction information is received from the laser beam irradiation detection device 10A (YES), the system control device 20 causes the monitor 21a to display an icon indicating the emission position direction step S14 and shifts the process to step S15.

When the emission position direction information is not received from the laser beam irradiation detection device 10A in step S13 (NO), the system control device 20 shifts the process to step S15.

The system control device 20 determines in step S15 whether the emission position information is received from the laser beam irradiation detection device 10B. When the emission position information is received from the laser beam irradiation detection device 10B (YES), the system control device 20 causes the monitor 21b to display an icon indicating the emission position in step 16 and shifts the process to step S19.

When the emission position information is not received from the laser beam irradiation detection device 10B in step S15 (NO), the system control device 20 determines in step S17 whether the emission position direction information is received from the laser beam irradiation detection device 10B. When the emission position direction information is received from the laser beam irradiation detection device 10B (YES), the system control device 20 causes the monitor 21b to display an icon indicating the emission position direction in step S18 and shifts the process to step S19.

When the emission position direction information is not received from the laser beam irradiation detection device 10B in step S17 (NO), the system control device 20 shifts the process to step S19.

The system control device 20 determines in step S19 whether the emission position information is received from the laser beam irradiation detection device 10C. When the emission position information is received from the laser beam irradiation detection device 10C (YES), the system control device 20 causes the monitor 21c to display an icon indicating the emission position in step 20 and shifts the process to step S23.

When the emission position information is not received from the laser beam irradiation detection device 10C in step S19 (NO), the system control device 20 determines in step S21 whether the emission position direction information is received from the laser beam irradiation detection device 10C. When the emission position direction information is received from the laser beam irradiation detection device 10C (YES), the system control device 20 causes the monitor 21c to display an icon indicating the emission position direction in step S22 and shifts the process to step S23.

When the emission position direction information is not received from the laser beam irradiation detection device 10C in step S21 (NO), the system control device 20 shifts the process to step S23.

In step S23, the system control device 20 determines whether the end of the display process of the laser beam irradiation detection result is instructed. When the end of the display process is not instructed (NO), the system control device 20 returns the process to step S11 and repeats the processes of steps S11 to S23. When the end of the display process is instructed (YES), the system control device 20 ends the process.

Figure 13:
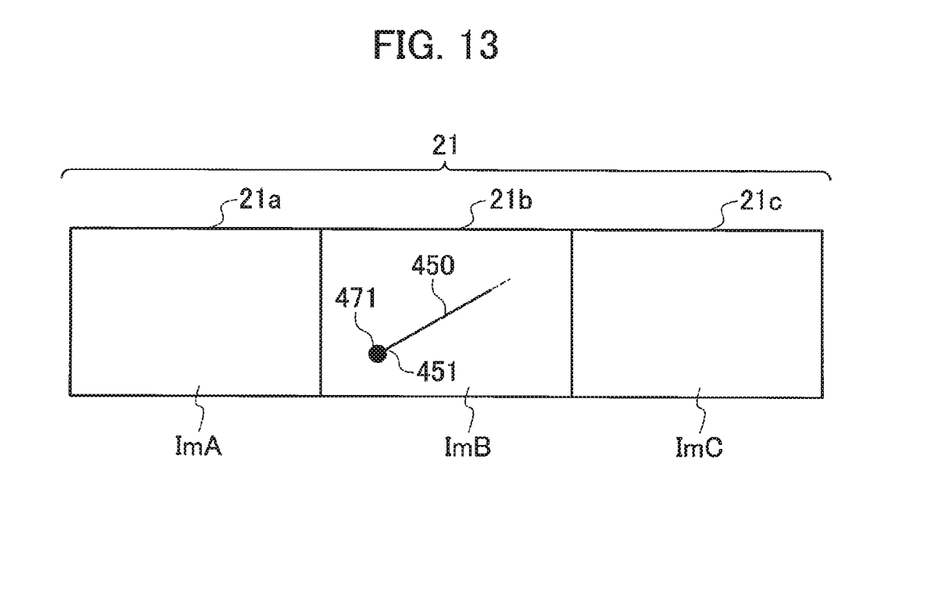
FIG. 13 is a view illustrating a first example of a laser beam trajectory and an icon displayed on the monitor 21 when the laser beam irradiation detection system according to one or more embodiments detects irradiation of the laser beam.

As an example, FIG. 13 illustrates a state where the laser beam irradiation detection device 10B detects that the laser beam emission position exists within the angle of view by the process illustrated in FIG. 11 and the system control device 20 causes the monitor 21b to display an icon 471 indicating the emission position by the process illustrated in FIG 12. Here, the illustration of the landscape is omitted for the sake of simplicity.

FIG. 13 illustrates an example in which the icon 471 of a circular shape is overlapped and displayed on the first end portion 451 which is the laser beam emission position. The icon 471 is not limited to a circle shape and the icon 471 may be displayed so as not to overlap with the first end portion 451.

Figure 14:
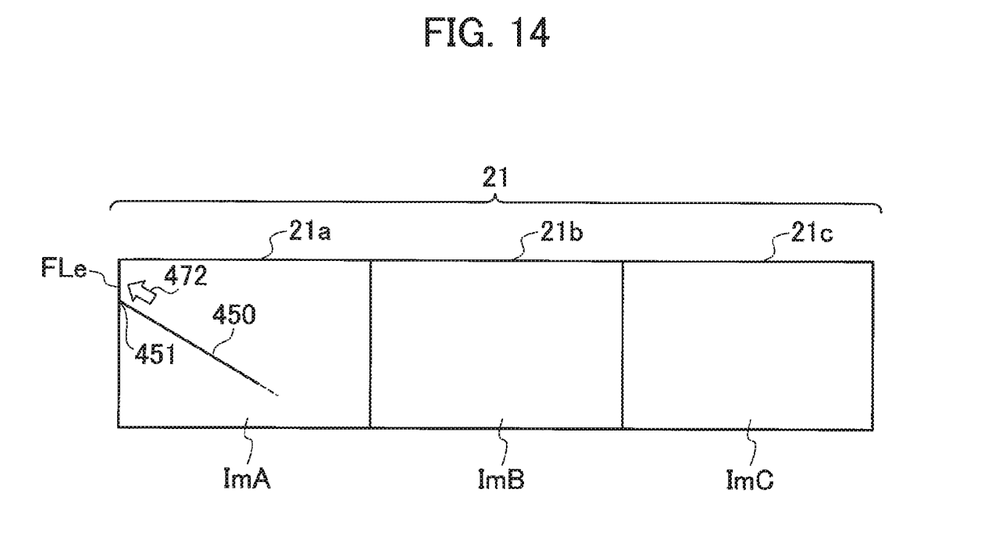
FIG. 14 is a view illustrating a second example of a laser beam trajectory and an icon displayed on the monitor 21 when the laser beam irradiation detection system according to one or more embodiments detects irradiation of the laser beam.

As an example, FIG. 14 illustrates a state where the laser beam irradiation detection device 10A detects that there is a laser beam trajectory 450 although the laser beam emission position does not exist within the angle of view by the process illustrated in FIG. 11, and the system control device 20 causes the monitor 21a to display an icon 472 indicating the emission position direction by the process illustrated in FIG. 12. Here, the illustration of the landscape is omitted for the sake of simplicity.

In FIG. 14, since the first end portion 451 is located at the left end portion FLe of the frame F2, it can be estimated that the laser beam emission position exists in a direction in which the trajectory 450 is extended to the left than the first end portion 451. In the example illustrated in FIG. 14, the system control device 20 has the icon 472 with an arrow pointing in a direction in which the trajectory 450 is extended to the left. The icon 472 is not limited to an arrow.

Since the system control device 20 can detect the inclination of the trajectory 450, the inclination of the icon 472 can be displayed according to the inclination of the trajectory 450.

As described above, in accordance with the laser beam irradiation detection device, the laser beam irradiation detection method, and the laser beam irradiation detection system according to one or more embodiments, it can be detected that the laser beam is irradiated to a predetermined target object such as the windshield of the cockpit of an airplane. In accordance with the laser beam irradiation detection device, the laser beam irradiation detection method, and the laser beam irradiation detection system according to one or more embodiments, the emission position or the emission position direction of the laser beam can be detected.

In accordance with the laser beam irradiation detection system according to one or more embodiments, a monitoring person can easily recognize the emission position or the emission position direction of the laser beam by the image displayed on the monitor 21.

In the configuration example illustrated in FIG. 1, the laser beam irradiation detection device 10 is configured using existing video cameras 1 and 2. However, the laser beam irradiation detection device may be configured by improving the internal configuration of the video camera.

Figure 15:
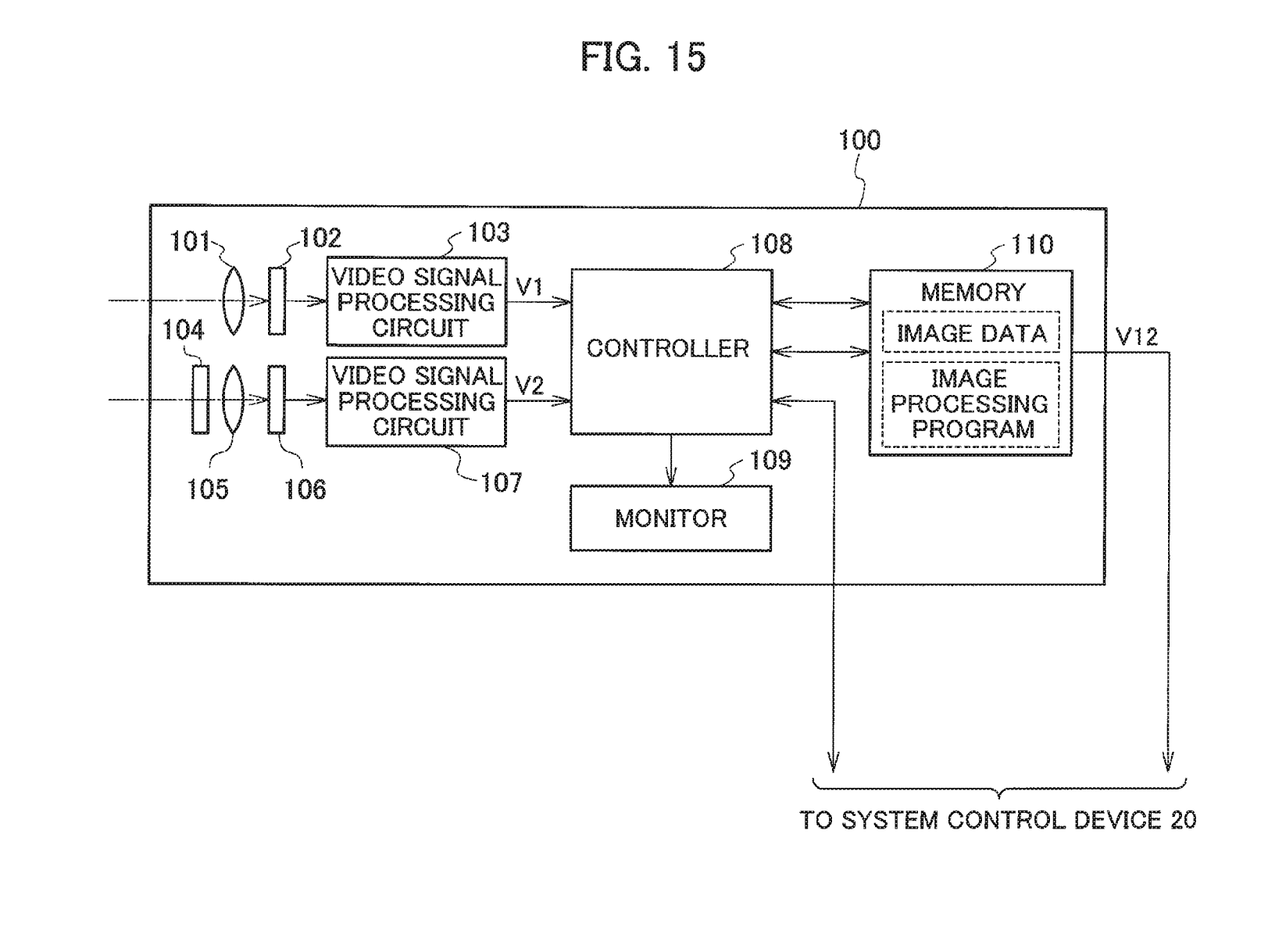
FIG. 15 is a block diagram illustrating a modification example of the laser beam irradiation detection device according to one or more embodiments.

A video camera 100 illustrated in FIG. 15 configures a laser beam irradiation detection device. In FIG. 15, a light ray from a subject is incident on an imaging element 102 through one or a plurality of lenses 101 and is imaged. A video signal processing circuit 103 generates a video signal V1 based on the imaging signal from the imaging element 102.

Moreover, a light ray from a subject is incident on an imaging element 106 through a bandpass filter 104 and one or a plurality of lenses 105 and is imaged. Similar to the bandpass filter 3, the bandpass filter 104 allows a light ray of a predetermined band including the wavelength band of the color of the laser beam, which is the target of the detection, among the light rays from the subject to pass therethrough, and attenuates the light ray of the other band. The video signal processing circuit 107 generates a video signal V2 based on the imaging signal from the imaging element 106.

The operation of the controller 108, the monitor 109, and the memory 110 is similar to that of the controller 4, the monitor 5, and the memory 6. The monitor 109 can be omitted.

The invention is not limited to one or more embodiments described above, and various modifications can be made without departing from the scope of the invention. In one or more embodiments, by executing an image processing program, the controller 4 generates the histogram of the video signal V2, detects the existence of the trajectory of the straight light ray, and determines whether the target object is irradiated with a laser beam. The configuration for executing those operations may be realized by hardware.

The use of hardware and software in the configuration of the laser beam irradiation detection device 10 or the laser beam irradiation detection system is optional.

A target object for detecting the irradiation of the laser beam is not limited to the windshield of the cockpit of the airplane or the like. The target object may be an automobile, a player playing sports, or the like. In one or more embodiments, three laser beam irradiation detection devices 10 are used, but an appropriate number of laser beam irradiation detection devices 10 may be used according to the range of the target object for detecting the irradiation of the laser beam. The laser beam irradiation detection devices 10 may be arranged so as to monitor a 360-degree range around a predetermined point.

The disclosure of the present application is related to the subject matter described in Japanese Patent Application No. 2017-041441 filed on Mar. 6, 2017, the entire disclosure content of which is incorporated herein by reference.

It should be noted that various modifications and variations may be made to one or more embodiments without departing from the novel and advantageous features of the invention other than those already described. Accordingly, all such modifications and variations are intended to be included within the scope of the appended claims.

What is claimed is:

1. A laser beam irradiation detection device comprising:
   a bandpass filter configured to allow a light ray of a predetermined band including a wavelength band of a color of a laser beam, which is a target of detection, among light rays from a subject to pass therethrough;
   an imaging unit configured to image the light ray passing through the bandpass filter;
   a detector configured to analyze a frequency for each brightness level of a video signal generated based on an imaging signal output from the imaging unit to detect a peak at which the frequency protrudes at a specific brightness level, and to detect a trajectory of a straight light ray in a frame of the video signal, the trajectory of the light ray having a first end portion and a second end portion, wherein the detector is further configured to determine that the laser beam is irradiated, the detector determining that the laser beam is irradiated when the detector detects the peak at the specific brightness level, and when the detector detects the trajectory of the light ray in the frame; and an emission position detector configured to determine that the first end portion is a laser beam emission position, the emission position detector determining that the first end portion is a laser beam emission position when the first end portion is detected inside the frame, and when the brightness level decreases from the first end portion to the second end portion, and when the second end portion moves in an arc shape.

2. The laser beam irradiation detection device according to claim 1, further comprising:

an emission position direction estimation unit configured to estimate that a laser beam emission position exists in a direction in which the trajectory of the light ray extends outward beyond the first end portion, wherein the emission position direction estimation unit estimates that the laser beam emission position exists in the direction in which the trajectory of the light ray extends outward beyond the first portion when the first end portion is located at an end portion of the frame, and when the brightness level decreases from the first end portion to the second end portion, and when the second end portion moves in an arc shape.

3. A laser beam irradiation detection method comprising:

allowing a light ray of a predetermined band including a wavelength band of a color of a laser beam, which is a target of detection, among light rays from a subject to pass and attenuating light rays in other bands with a bandpass filter;

imaging the light ray of the predetermined band with an imaging unit;

analyzing a frequency for each brightness level of a video signal generated based on an imaging signal output from the imaging unit and detecting a peak at which the frequency protrudes at a specific brightness level;

detecting a trajectory of a straight light ray in a frame of the video signal, the trajectory of the straight light ray having a first end portion and a second end portion;

determining that the laser beam is irradiated when the peak is detected at the specific brightness level, and when the trajectory of the light ray is detected in the frame; and determining that the first end portion is a laser beam emission position when the first end portion is detected inside the frame, and when the brightness level is detected to decrease from the first end portion to the second end portion, and when the second end portion moves in an arc shape.

4. The laser beam irradiation detection method according to claim 3, further comprising:

estimating that a laser beam emission position exists in a direction in which the trajectory of the light ray extends outward beyond the first end portion when the first end portion is detected to be located at an end portion of the frame, and when the brightness level is detected to decrease from the first end portion to the second end portion, and when the second end portion moves in an arc shape.

5. A laser beam irradiation detection system comprising:

a plurality of laser beam irradiation detection devices with mutually offset ranges for imaging a subject;

a system control device to which image data output from the plurality of laser beam irradiation detection devices are supplied; and a monitor which displays an image based on the image data which is output from the plurality of laser beam irradiation detection devices and supplied to the system control device, wherein each of the plurality of the laser beam irradiation detection device comprises:

an image synthesizing unit configured to synthesize a first video signal generated based on a first imaging signal that captures a light ray from a subject and a second video signal generated based on a second imaging signal that captures a light ray obtained by causing a light ray of a predetermined band including a wavelength band of a color of the laser beam, which is a target of detection, among light rays from the subject to pass through a bandpass filter, and to generate a synthesized video signal;

a detector configured to analyze a frequency for each brightness level of the second video signal, to detect a peak at which a frequency protrudes at a specific brightness level, to detect a trajectory of a straight light ray in a frame of the second video signal, and to detect that the laser beam is irradiated when it is detected that the peak exists at the specific brightness level and the trajectory of the light ray exists in the frame, the trajectory of the straight light ray having a first end portion and a second end portion; and a position and direction information generator configured to selectively generate emission position information indicating a laser beam emission position and to selectively generate emission position direction information indicating an emission position direction, the position and direction information generator being further configured to supply the emission position information or the emission position direction information to the system control device when the detector detects that the laser beam is irradiated, wherein the position and direction information generator determines that the first end portion is a laser beam emission position when the first end portion is detected inside the frame, and when the brightness level is detected to decrease from the first end portion to the second end portion, and when the second end portion moves in an arc shape, and wherein the position and direction information generator estimates that the laser beam emission position exists in a direction in which the trajectory of the light ray extends outward beyond the first end portion when the first end portion is located at an end portion of the frame, and when the brightness level is detected to decrease from the first end portion to the second end portion, and when the second end portion moves in an arc shape, and wherein the system control device is configured to display on the monitor a synthesized image based on the synthesized video signal generated by the image synthesizing unit, and to superimpose and display an identification image indicating the laser beam emission position or the emission position direction on the synthesized image based on the emission position information or the emission position direction information.

* * * * *